(12) United States Patent  
Yoshimura et al.

(10) Patent No.: US 6,502,938 B2  
(45) Date of Patent: Jan. 7, 2003

(54) ATTACHMENT STRUCTURE OF A FRAME BODY RELATIVE TO A FRONT PORTION

(75) Inventors: Kazue Yoshimura, Fukui-ken (JP); Hideyo Miyoshi, Fukui-ken (JP); Shuichiro Ishikawa, Fukui-ken (JP); Katsumi Yamamoto, Fukui-ken (JP); Osamu Morihiro, Fukui-ken (JP)

(73) Assignee: Horikawa Co., Ltd., Fukui-ken (JP)

(*) Notice: Subject to any disclaimer, the term of this patent is extended or adjusted under 35 U.S.C. 154(b) by 0 days.

(21) Appl. No.: 10/015,717

(22) Filed: Oct. 30, 2001

(65) Prior Publication Data

US 2002/0051115 A1 May 2, 2002

(30) Foreign Application Priority Data

Oct. 31, 2000 (JP) ........................................ 2000-333751

(51) Int. Cl.⁷ .................................................. G02C 1/04
(52) U.S. Cl. .................... 351/103; 351/105; 351/106; 351/126; 351/135
(58) Field of Search ........................ 351/41, 68, 69, 351/103–109, 110, 124, 126, 133–136, 138, 142–152, 154

(56) References Cited

U.S. PATENT DOCUMENTS 2,370,843 A * 3/1945 Croninger .................... 351/135

6,345,892 B2 * 2/2002 Nakamura ................... 351/103
6,386,704 B1 * 5/2002 Wu ............................. 351/106

FOREIGN PATENT DOCUMENTS

JP           10-3055952            11/1998

* cited by examiner

*Primary Examiner*—Huy Mai  
(74) *Attorney, Agent, or Firm*—Flynn, Thiel, Boutell & Tanis, P.C.

(57) ABSTRACT

There is provided an attachment structure of a frame body relative to a front portion capable of attaching the frame body to the front portion with a simple construction, and also there is provided an attachment structure of a frame body relative to a front portion wherein stress or distortion of the frame body is hardly transmitted to the front portion. The attachment structure of a frame body relative to a front portion comprises a curved hooked portion formed on the frame body at the central position, and a groove portion defined in the front portion at the central position, wherein the curved hooked portion elastically presses the groove portion so as to engage the curved hooked portion in the groove portion. The frame body can be easily attached to or detached from the front portion with one-touch operation, and hence the operation is made with very ease, and further even if the frame body is distorted or deformed, the distortion is hardly transmitted to the front portion.

15 Claims, 9 Drawing Sheets

(A)

(B)

(C)

ATTACHMENT STRUCTURE OF A FRAME BODY RELATIVE TO A FRONT PORTION

BACKGROUND OF THE INVENTION

1. Field of the Invention

The invention relates to an attachment structure of a frame body relative to a front portion, more particularly to a structure for attaching the frame body to the front portion with simplicity and reliability utilizing at least elastic pressing force of the frame body.

2. Description of the Related Art

There is a tendency that eyeglasses are used depending on TPO (time, place, occasion) as a manner of a usage pattern, and hence there have been recently demands of eyeglasses for various high functions as well as design thereof. As an example of TPO, eyeglasses having slightly gray color are used at a bright spot while those having transparent and bright color are used at night. In this case, it is uneconomic to replace eyeglasses by other eyeglasses, and hence only lenses of eyeglasses (hereinafter referred to eyeglass lenses) alone are replaced with other lenses depending on the object of utilization. It is very useful if the frame body is attached to or detached from the front portion with ease without requiring a skilled work when replacing the eyeglass lenses. Simple eyeglasses are developed, as disclosed in, for example, Japanese Utility Model Registration No. 3,055,952 which glasses take into consideration the foregoing demands.

Japanese Utility Model Registration No. 3,055,952 discloses the eyeglasses wherein particular holding means are provided in both a frame made of an elastic material for supporting lenses and eyeglass lenses, wherein both the frame and eyeglass lenses are detachably attached to each other by way of the holding means. The holding means of the frame for supporting lenses (hereinafter referred to as lens supporting frame) comprises bridge having a pair of central hooks and end hooks protruded forward at both ends, whereas the holding means of the eyeglass lenses comprises a curved nose insertion portion having a pair of notched portions and a pair of slots corresponding to the end hooks. When the lens supporting frame is attached to the eyeglass lenses, the bridge of the lens supporting frame is inserted into the curved nose insertion portion of the eyeglass lenses, while a pair of central hooks are engaged in a pair of notched portions, whereby the lens supporting frame is held by and fixed to the eyeglass lenses by the bridge and end hooks.

However, with the eyeglasses having the foregoing structure, the end hooks of the lens supporting frame are not positioned as set if the positions of two slots defined in the eyeglass lenses are not set with precision, causing a problem that lenses are cracked when the pair of central hooks are forced to engage in the pair of notched portions. The provision of the slits of lenses at correct positions corresponding to both hooks requires production severity. Further, since the lens supporting frame is supported on the eyeglass lenses at three points when the eyeglasses are put on or put off, the stress or distortion of the lens supporting frame is directly transmitted to the eyeglass lenses. Further, since the shape of bridge is complex, the bridge prevents a visual fields by way of the lenses.

SUMMARY OF THE INVENTION

The invention has been developed under the foregoing technical background and intended to solve the foregoing problems. That is, an object of the invention is to provide an attachment structure of a frame body relative to a front portion capable of easily attaching the frame body to the front portion. It is another object of the invention to provide an attachment structure of a frame body relative to a front portion wherein stress or distortion of the frame body is hardly transmitted to the front portion.

The inventors of the application endeavored themselves to study the foregoing problems and have found to solve the conventional problems by engaging both the frame body and front portion at the central positions thereof, thereby supporting the frame body by and fixing the same to the front portion, and have completed the invention based on this finding.

That is, firstly, the invention resides in an attachment structure of a frame body relative to a front portion characterized in comprising a curved hooked portion formed on the frame body at the central position, and a groove portion defined in the front portion at the central position, wherein the curved hooked portion elastically presses the groove portion so as to engage the curved hooked portion in the groove portion.

Secondary, the invention resides in an attachment structure of a frame body relative to a front portion comprising a curved hooked portion formed to stand upright on the frame body at the central position and provided with a pair of pad arms fixed thereto, and a groove portion defined in the front portion at the central position, wherein the curved hooked portion elastically presses the groove portion so as to engage the curved hooked portion in the groove portion.

Thirdly, the invention resides in the attachment structure of a frame body relative to a front portion characterized in that the curved hooked portion is attached to the groove portion by way of an elastic sleeve.

Fourthly, the invention resides in the attachment structure of a frame body relative to a front portion characterized in that the groove portion is a notched portion which is opened outward.

Fifthly, the invention resides in the attachment structure of a frame body relative to a front portion characterized in that the front portion is a frameless lens.

Sixthly, the invention resides in the attachment structure of a frame body relative to a front portion characterized in that the front portion is lenses having a frame fixed thereto.

Seventhly, the invention resides in the attachment structure of a frame body relative to a front portion characterized in that a lens is attached to the frame body.

Eighthly, the invention resides in the attachment structure of a frame body relative to a front portion characterized in that the curved hooked portion is formed on the frame body to stand upright inwardly.

Ninthly, the invention resides in the attachment structure of a frame body relative to a front portion characterized in that the curved hooked portion is formed on the frame body to stand upright outwardly.

Tenthly, the invention resides in an attachment structure of a frame body relative to a front portion characterized in comprising a curved hooked portion formed on the frame body at the central position to stand upright outwardly and provided with a pair of pad arms fixed thereto, and a groove portion defined in the front portion at the central position, wherein the front portion is formed of a frameless lens, and the curved hooked portion elastically presses the groove portion so as to engage the curved hooked portion in the groove portion by way of an elastic sleeve.

Eleventh, the invention resides in an attachment structure of a frame body relative to a front portion characterized in comprising a first groove defined in the frame body at the central position and a second groove defined in the front portion at the central position, a curved hooked member provided with a pair of pad arms respectively elastically presses both the first and second grooves so as to engage the curved hooked member in both the first and second grooves.

Twelfth, the invention resides in the attachment structure of a frame body relative to a front portion characterized in that the curved hooked member is attached to the groove portion by way of an elastic sleeve.

Thirteenth, the invention resides in the attachment structure of a frame body relative to a front portion characterized in that the front portion is a frameless lens.

Fourteenth, the invention resides in the attachment structure of a frame body relative to a front portion characterized in that the front portion is lenses having a frame fixed thereto.

Fifteenth, the invention resides in the attachment structure of a frame body relative to a front portion characterized in that the curved hooked member is provided with a pair of pad arms extended from the curved portion.

The invention can employ a structure comprising the combination of not less than two selected from the first to tenth aspects of the invention and the combination of not less than two selected from the eleventh to fifteenth aspects of the invention if it can meet the object of the invention.

BRIEF DESCRIPTION OF THE DRAWINGS

FIG. 1 is a perspective view showing the eyeglasses as a whole according to a first embodiment of the invention, wherein FIG. 1(A) is a view showing a state before a frame body is attached to a front portion and FIG. 1(B) is a view showing a state after the frame body is attached to the front portion.

FIG. 2 is an enlarged view of main portions of the front portion and frame body according to the first embodiment of the invention, wherein FIG. 2(A) is a partially enlarged view of the front portion, and FIG. 2(B) is a partially enlarged view of the frame body.

FIG. 4 is a perspective view showing the eyeglasses as a whole according to a second embodiment of the invention, wherein FIG. 4(A) is a view showing a state before a frame body is attached to a front portion, and FIG. 4(B) is a view showing a state after the frame body is attached to the front portion.

FIG. 5 is a perspective view showing the eyeglasses as a whole according to a third embodiment of the invention, wherein FIG. 5(A) is a view showing a state before a frame body is attached to a front portion, and FIG. 5(B) is a view showing a state after the frame body is attached to the front portion.

FIG. 8 is a perspective view showing the eyeglasses as a whole according to a fifth embodiment of the invention, wherein FIG. 8(A) is a view showing a state before a frame body is attached to a front portion, and FIG. 8(B) is a view showing a state after the frame body is attached to the front portion.

FIG. 11 is a perspective view showing the eyeglasses as a whole according to a modification of the fifth embodiment, which are provided with lenses attached to the frame body according to the fifth embodiment of the invention, wherein FIG. 11(A) is a view showing a state before a frame body is attached to a front portion, and FIG. 11(B) is a view showing a state after the frame body is attached to the front portion.

PREFERED ENBODIMENT OF THE INVENTION

A concrete attachment structure of a frame body relative to a front portion according to first to sixth embodiments of the invention are described hereinafter with reference to FIGS. 1 to 11.

Figure 1:
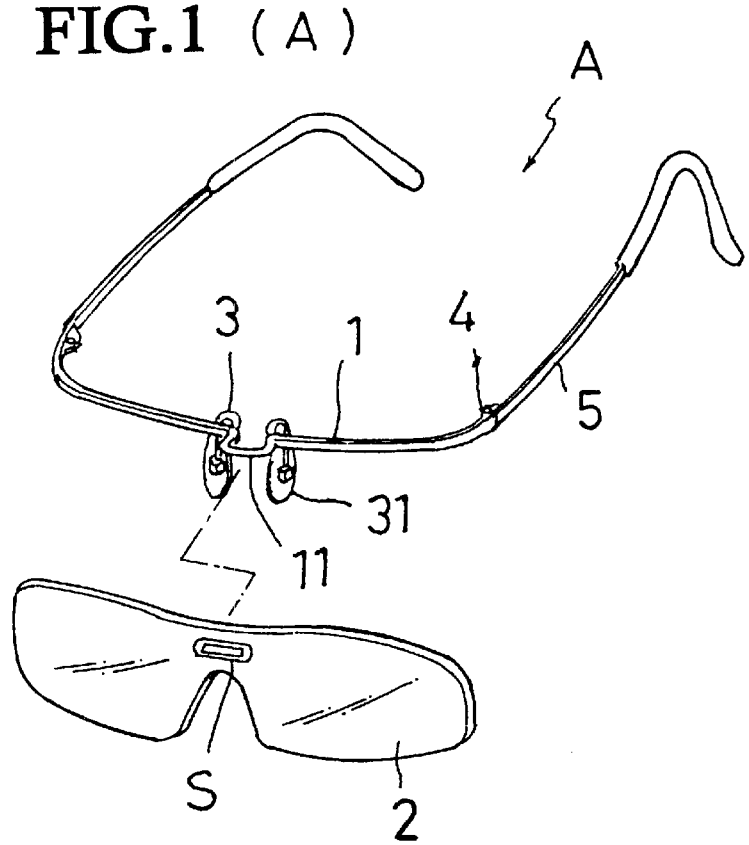
Figure 1:
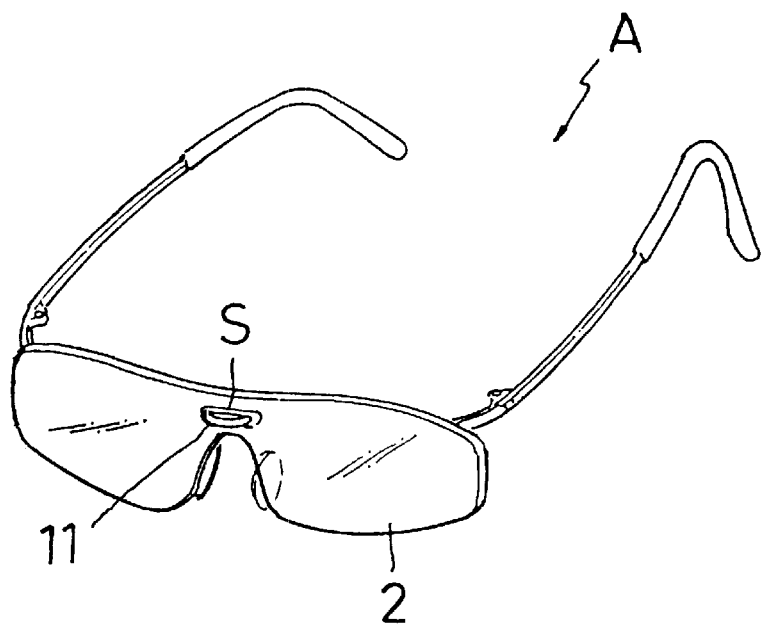
Figure 2:
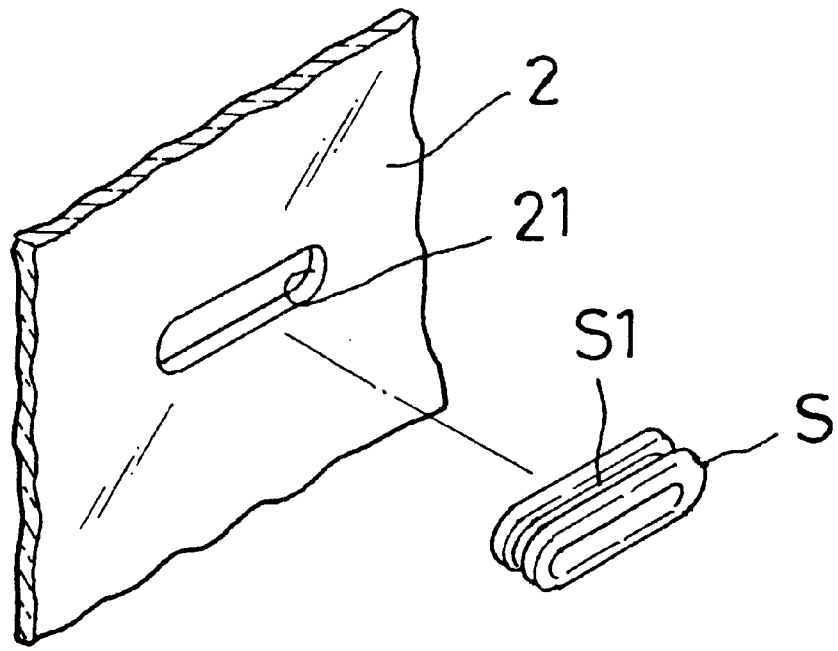
Figure 2:
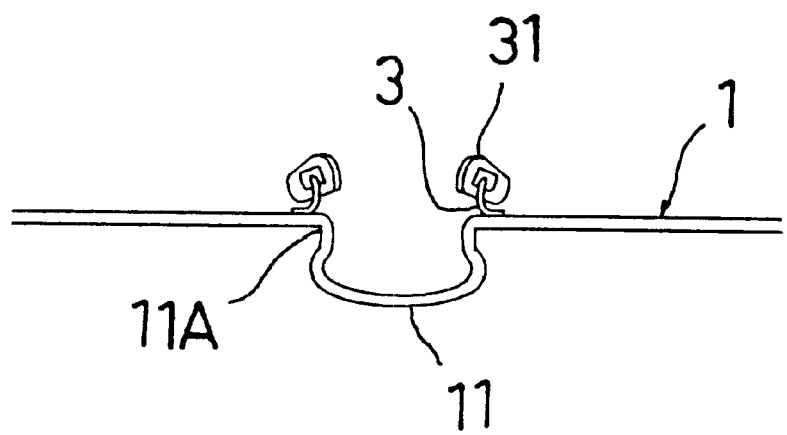
Figure 3:
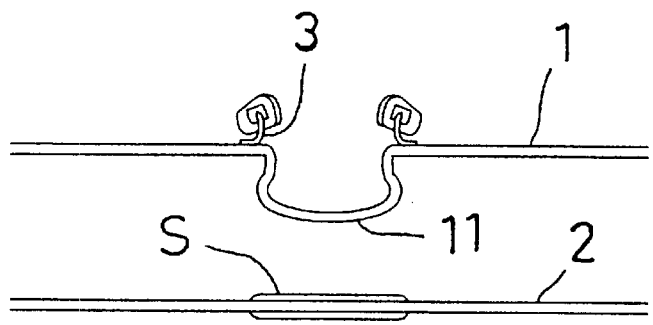
FIGS. 3(A), 3(B) and 3(C) are views showing steps of attaching the frame body to the front portion according to the first embodiment of the invention.
Figure 3:
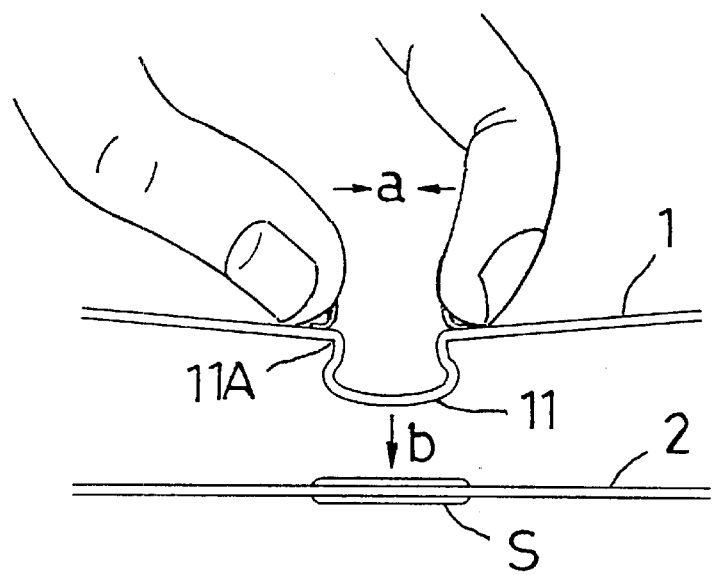
Figure 3:
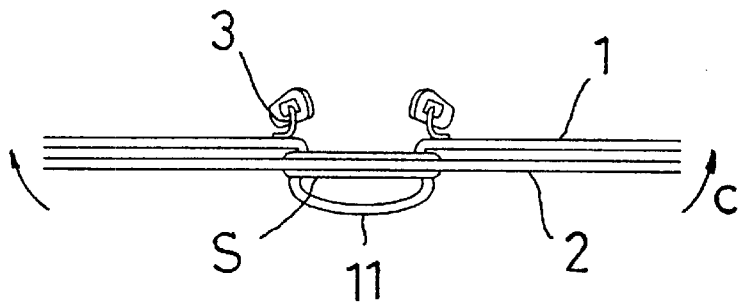

First Embodiment: FIG. 1 is a perspective view showing the eyeglasses as a whole according to the first embodiment of the invention, wherein FIG. 1(A) is a view showing a state before a frame body is attached to a front portion, and FIG. 1(B) is a view showing a state after the frame body is attached to the front portion. FIG. 2 is an enlarged view of main portions of the front portion and frame body according to the first embodiment of the invention, wherein FIG. 2(A) is a partially enlarged view of the front portion, and FIG. 2(B) is a partially enlarged view of the frame body.

As shown in FIG. 1, eyeglasses A comprise a front portion 2 and a frame body 1 which is stably attached to the front portion 2, and temples 5 which are turnably attached to the frame body 1 by way of hinges 4. So-called brackets including the hinges 4 are extended from the frame body at front surface portion thereof, but it is needless to say that separately manufactured brackets can be fixed to the frame body at the front portion 2.

A curved hooked portion 11 is formed at the central position of the frame body 1 to stand upright outwardly so as to attach the frame body 1 to the front portion 2. The frame body 1 can be supported by and fixed to the front portion 2, described later, by the curved hooked portion 11. Describing the curved hooked portion 11 more in detail, throttled portions 11A are provided at both ends of the curved hooked portion 11, as shown in FIG. 2(B), and the throttled portions 11A is engaged in a groove portion 21 of the front portion 2, described later.

It is designed that the width of the curved hooked portion 11 is ordinarily (when no load is applied to the curved hooked portion 11) larger than that of the groove portion 21 of the front portion 2, thereby preventing the engaged front portion 2 from being come off. A pair of pad arms 3 provided with nose pad members 31 are fixed to the curved hooked portion 11 by e.g., brazing.

The front portion 2 according to the first embodiment has no frame for fixing the periphery of a lens thereto, a so-called frameless lens. Such a frameless lens obtains a sufficient visibility without being obstructed in a visual field, and it is bright and has light weight. A groove portion 21 is defined in the front portion 2 at the central position for receiving the curved hooked portion 11 provided on the frame body 1.

According to the attachment structure of the invention, the front portion 2 and the frame body 1 are attached to each other at the central positions thereof so that the frame body 1 is supported by and fixed to the front portion 2. More in detail, the structure is unique or characterized in engaging the curved hooked portion 11 positioned at the central position of the frame body 1 in the groove portion 21 defined in the front portion 2 at the central position, thereby attaching the frame body 1 to the front portion 2 with reliability. The front portion 2 to which the frame body 1 is attached can prevent a vertical displacement in the up and down direction relative to a lens surface, a horizontal displacement in the right and left direction relative to the lens surface, and a back and forth displacement in the vertical direction relative to the lens surface.

An elastic sleeve S is used as shown in FIG. 2(A) according to the first embodiment of the invention. The elastic sleeve S is a cylinder in the shape of a sleeve and has a circumferential groove S1 at the periphery thereof, and it is used in the manner that the elastic sleeve S is pressed into the groove portion 21 of the front portion 2 so that the circumferential groove S1 is engaged in the lens. When the frame body 1 is attached to the front portion 2, the curved hooked portion 11 of the frame body 1 is elastically engaged in the groove portion 21 by way of the elastic sleeve S. By using the elastic sleeve S, the periphery of the groove portion 21 is protected, namely, it is possible to prevent the lens of the front portion 2 from being cracked, thereby enhancing elastic pressing effect between the curved hooked portion 11 and the groove portion 21. For a material of the elastic sleeve S, a soft synthetic resin such as elastomer and the like is mainly used.

It is preferable, to more stably attach the frame body 1 to the front portion 2, that a curvature of a front curve (face curve) of the front portion 2 is set larger than that of the frame body 1, in other words, a curvature radius of the front curve of the front portion 2 is set smaller than that of the frame body 1.

With the foregoing attachment structure, when the frame body 1 is attached to the front portion 2, the curvature of the front curve of the front portion 2 becomes small, in other words, the curvature radius of the front curve becomes small so that a restoring force which is prone to return to the original curve is produced in the front portion 2. As a result, both ends of the front portion 2 are elastically pressed by the frame body 1. Accordingly, the frame body 1 is supported by and fixed to the front portion 2 at the central position thereof, so that both ends of the front portion 2 are brought into contact with the frame body 1 under pressure, thereby preventing a play of the front portion 2 so that the frame body 1 is reliably fixed to the front portion 2.

Steps of attaching the frame body 1 to the front portion 2 are described with reference to FIGS. 3(A), 3(B) and 3(C). In the first step, the pad arms 3 are strongly gripped by fingers in the direction of an arrow a from the initial state shown in FIG. 3(A) so as to largely bend the curved hooked portion 11. In the second step, the frame body 1 is pressed against the front portion 2. In this case, the curved hooked portion 11 of the frame body 1 is pressed into the groove portion 21 in the forward direction (in the direction of the arrow b) as shown in FIG. 3(B). When the curved hooked portion 11 is pressed into the groove portion 21, the former is inserted into the latter. In the third step, after the curved hooked portion 11 is inserted into the groove portion 21, a force is released from the fingers so that the curved hooked portion 11 is expanded to an original state by its restoring force so that throttled portions 11A of the curved hooked portion 11 are retained by the groove portion 21 (by the elastic sleeve S, more in detail). As a result, the curved hooked portion 11 of the frame body 1 is supported by and fixed to the groove portion 21 of the front portion 2, namely the former is elastically engaged in the latter under pressure (see FIG. 3(C)).

As set forth in detail above, an operation procedure comprising three steps of gripe→insertion→release is effected all at once so that the frame body 1 can be attached to the front portion 2 by one-touch simple operation. Meanwhile, it is easily understand that when the frame body 1 is detached from the front portion 2, an operation procedure comprising three steps of grip→removal→release is effected all at once so that the frame body 1 can be detached from the front portion 2 by one-touch simple operation.

Upon completion of the attachment of the front portion 2, the curvature of the front curve of the front portion 2 becomes smaller than that before the frame body 1 is attached to the front portion 2, so that a repulsive force is produced at both ends of the front portion 2, thereby strongly pressing the frame body 1 (in the direction of the arrow c). The pressing force of the front portion 2 at both ends is uniformly applied to the frame body 1 to the right and left.

As set forth above, the groove portion 21 defined in the center of the front portion 2 is supported by and engaged with the curved hooked portion 11 provided on the frame body 1, so that the frame body 1 is brought into contact with both ends of the front portion 2 under pressure. In such a manner, the frame body 1 is supported by and fixed to the front portion 2 at three points, i.e., at the front portion and both end of the front portion 2, thereby rendering both the frame body 1 and front portion 2 always stable. For all the benefits set forth above, both ends of the front portion 2 and the frame body 1 are kept in a free state, and hence the degree of freedom of motion of the lens per se is assured.

With the attachment structure according to the first embodiment of the invention, when the eyeglasses are put on or put off from the face, or a shock is applied to the eyeglasses, an unexpected undue force is applied to the frame body 1, the frame body 1 is deformed (curved). However, such deformation is not directly transmitted to the front portion 2, imposing no strain or load to the lens of the front portion 2. Even in such a case, a frame body made of a shape-memory alloy having high resiliency which has been recently used can exert a sufficient effect although such a frame body is largely deformed. As described in detail above, the attachment structure of the first embodiment of the invention is very useful and also has a very simple structure, it is excellent in workability and has the merit of manufacturing.

Figure 4:
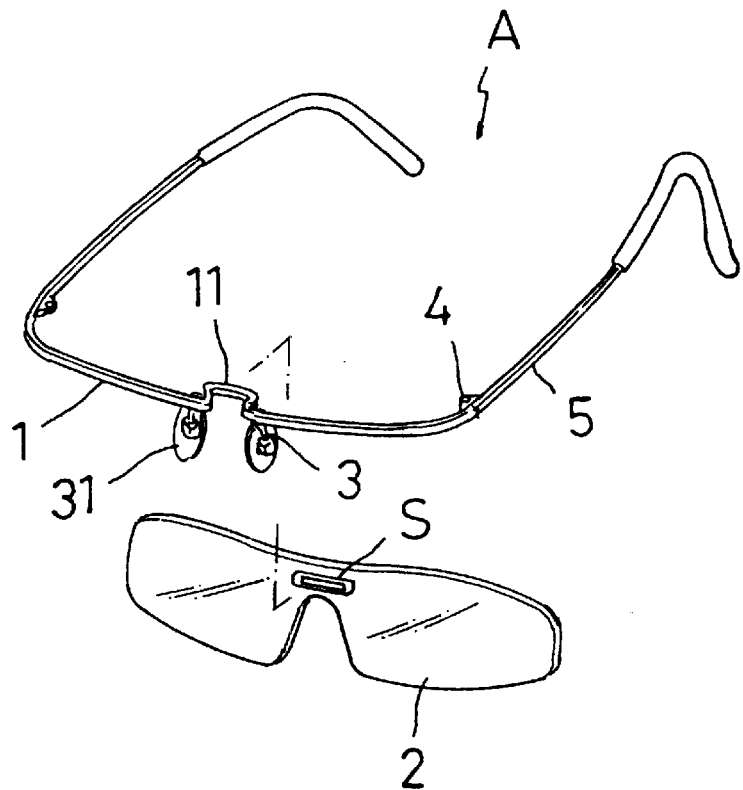
Figure 4:
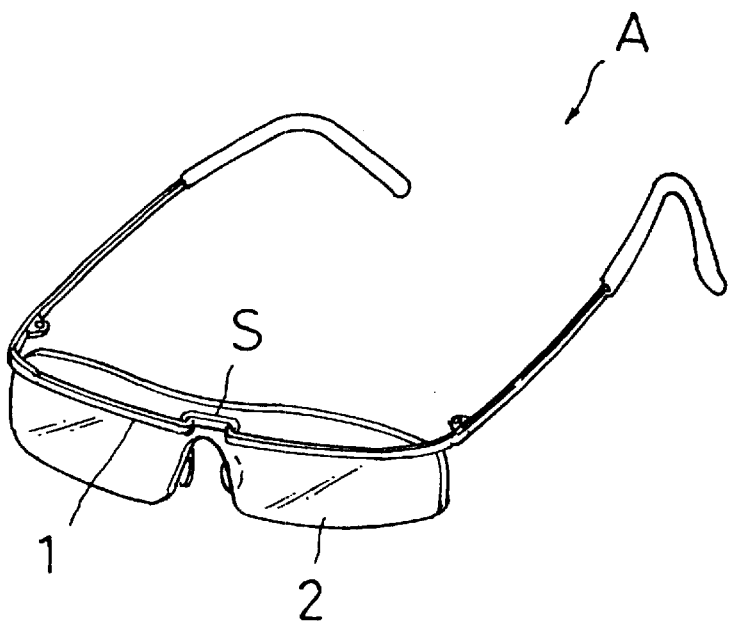

Second Embodiment: FIG. 4 is a perspective view showing the eyeglasses as a whole according to the second embodiment of the invention, wherein FIG. 4(A) is a view showing a state before a frame body is attached to a front portion, and FIG. 4(B) is a view showing a state after the frame body is attached to the front portion. A basic structure of a front portion 2 is the same as that of the first embodiment of the invention. A curved hooked portion 11 is provided on the frame body 1 at the central position which is attached to the front portion 2. The curved hooked portion 11 of the second embodiment is different from that of the first embodiment such that the former is formed to stand upright inwardly while the latter is formed to stand upright outwardly. Further, the second embodiment is different from the first embodiment such that the frame body 1 is attached to the front portion 2 from the direction opposite to the direction of the first embodiment.

Accordingly, the front portion 2, a curvature of a front curve (face curve) of the front portion 2 is set smaller than that of the frame body 1, in other words, a radius curvature of a front curve of the front portion 2 is set larger than that of the frame body 1. The attachment operation of the frame body 1 relative to the front portion 2 is the same as that shown in the first embodiment.

The pad arms 3 are strongly gripped by the fingers so as to largely bend the curved hooked portion 11, then the curved hooked portion 11 is inserted into the groove portion 21 of the frame body 1 in the direction opposite to the direction in the first embodiment. Finally, when a force is released from the fingers so that the curved hooked portion 11 is expanded to an original state by its restoring force so that throttled portions 11A of the curved hooked portion 11 are retained by the groove portion 21 (by the elastic sleeve S more in detail). In such a manner, an operation procedure comprising three steps of grip→insertion→release is effected all at once so that the frame body 1 can be attached to the front portion 2 by one-touch simple operation. When the attachment operation is completed, the frame body 1 obtains elastic fixing force at the center and both ends of the front portion 2, so that the frame body 1 can be supported by and fixed to the front portion 2 with reliability.

Figure 5:
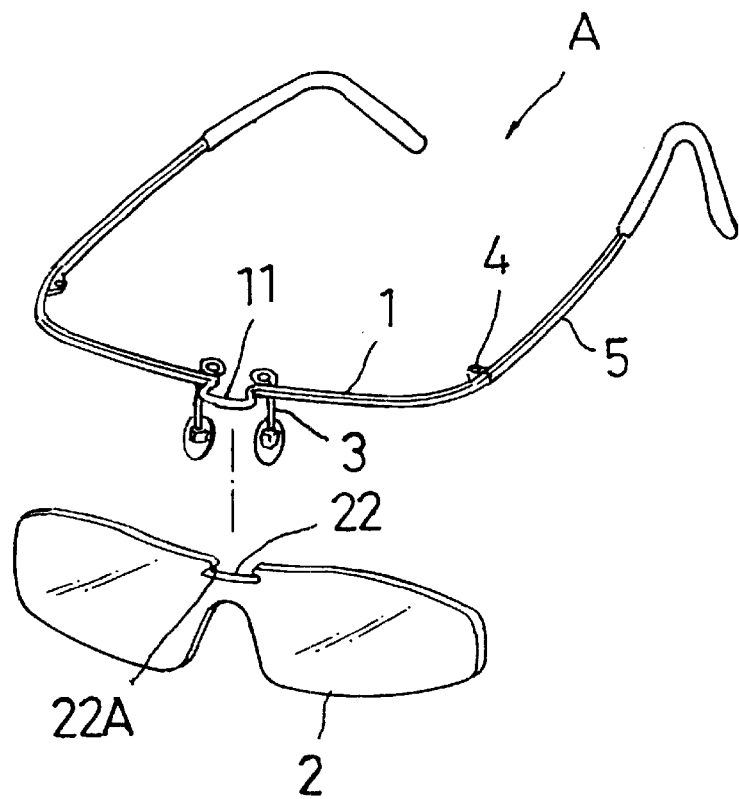
Figure 5:
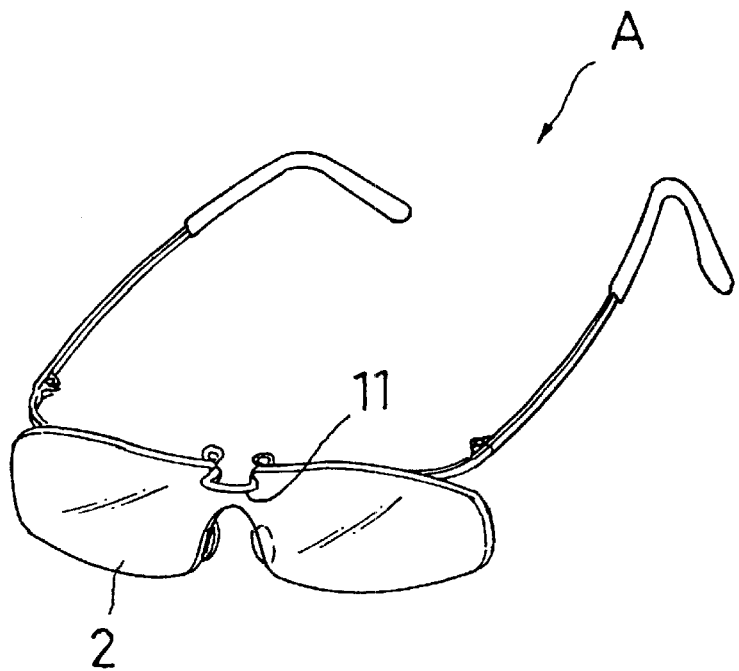

Third Embodiment: FIG. 5 is a perspective view showing the eyeglasses as a whole according to the third embodiment of the invention, wherein FIG. 5(A) is a view showing a state before a frame body is attached to a front portion, and FIG. 5(B) is a view showing a state after the frame body is attached to the front portion. The third embodiment is different from the first and second embodiments such that a groove portion defined in a front portion 2 at the central position is opened outward to form a notched portion 22. A recess 22A is formed on the notched portion 22 of the front portion 2, and throttled portions 11A of a curved hooked portion 11 of a frame body 1 are engaged in and retained by the recess 22A of the notched portion 22.

Although the frame body 1 can be also attached to the front portion 2 in the same attachment operation as the first embodiment, the curved hooked portion 11 of the frame body 1 is pressed down against the notched portion 22 of the front portion 2 from the above to engage the former into the latter, thereby attaching the former to the latter according to the third embodiment of the invention. That is, pad arms 3 are strongly gripped by fingers to bend the frame body 1 so that the curved hooked portion 11 is more largely bent.

Subsequently, the curved hooked portion 11 of the frame body 1 is inserted into the notched portion 22 of the front portion 2 from the above to the downward direction (vertical direction denoted by the arrow A relative to a lens surface). If fingers are released from the curved hooked portion 11, the curved hooked portion 11 is returned to an original state by its restoring force so that the throttled portions 11A of the frame body 1 are retained by the recess 22A of the notched portion 22, thereby completing the attachment operation. In such a manner, an operation procedure comprising three steps of gripe→insertion→release is effected all at once so that the frame body 1 can be attached to the front portion 2 by one-touch simple operation.

In a state where the attachment operation is completed, the frame body 1 is supported by and fixed to the front portion 2 at the center in the same manner as the first embodiment so that the frame body 1 is brought into contact with the front portion 2 under pressure at both ends thereof. Further, even if an undue stress is applied to the frame body 1 so that the frame body 1 is distorted and deformed, such distortion is not transmitted to the front portion front portion 2, so that the same effect as the first embodiment can be obtained.

Figure 6:
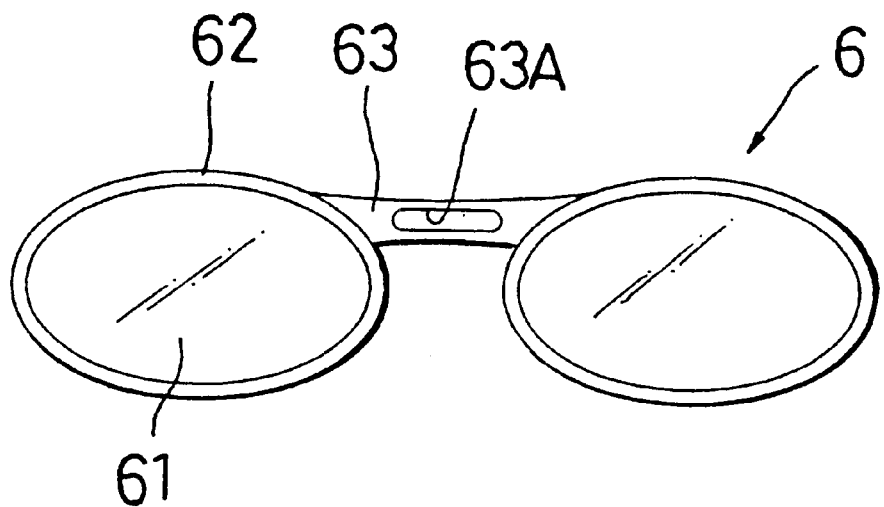
FIG. 6 is a view showing a front portion according to a fourth embodiment of the invention.
Figure 7:
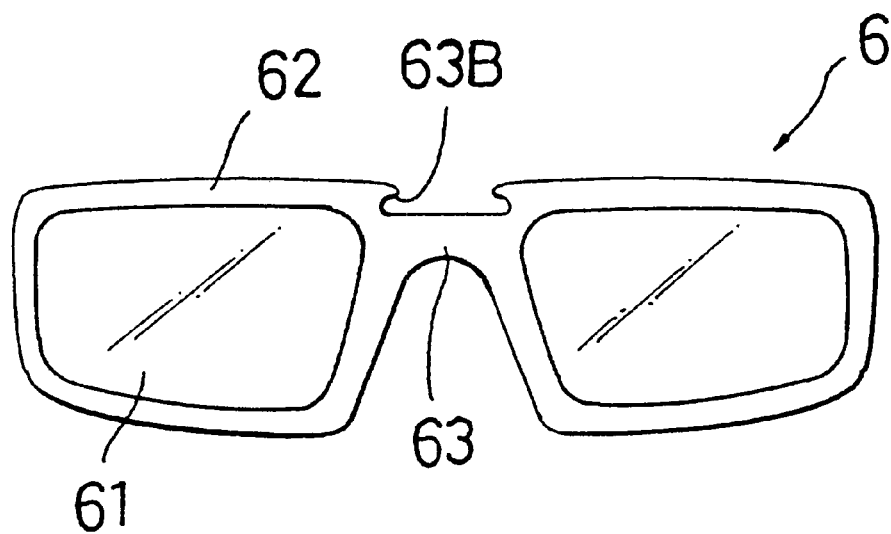
FIG. 7 is a view showing a front portion according to a modification of the fourth embodiment.

Fourth Embodiment: FIG. 6 is a view showing a front portion according to a fourth embodiment of the invention. FIG. 7 is a view showing a front portion according to a modification of the fourth embodiment. The front portion 2 according to the first to third embodiments of the invention has no frame for holding the lens thereby and fixing the lens thereto. According to the fourth embodiment, lenses 61 are surrounded by frames 62 to form lenses provided with the frames 62. A bridge 63 connecting both frames 62 surrounding the lenses 61 has a groove portion 63A. A curved hooked portion of a frame body is engaged in the groove portion 63A so that teach lens 61 is engaged with the frame 62 so that the frame body is supported by and fixed to the front portion.

Each lens 61 provided with a frame 62 in FIG. 7 has a notched portion 63B at a bridge 63 of the frame 62, wherein a curved hooked portion of a frame body is pressed into the notched portion 63B so that the frame body is supported by and fixed to the frame 62. Since a front portion of a frame body is attached to a central portion of a front portion 6, and the frame body is brought into contact with both ends of the front portion 6 under pressure, substantially the same effect as the first to third embodiments of the invention can be obtained.

Figure 8:
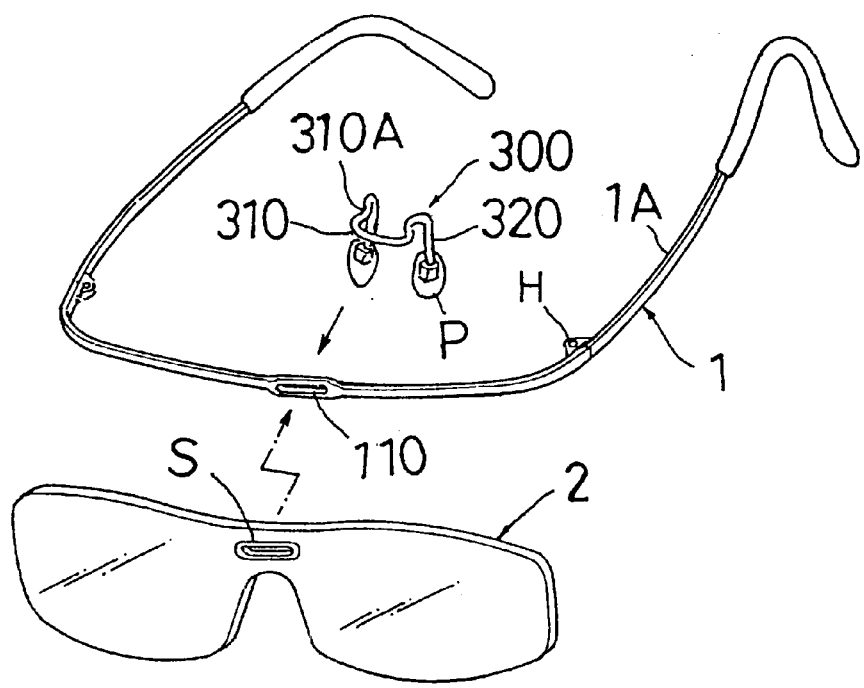
Figure 8:
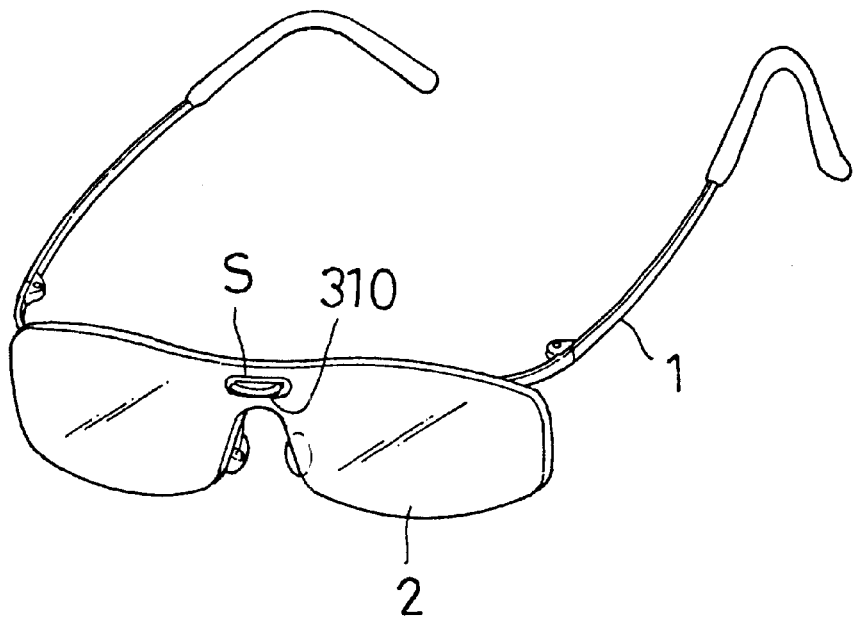
Figure 9:
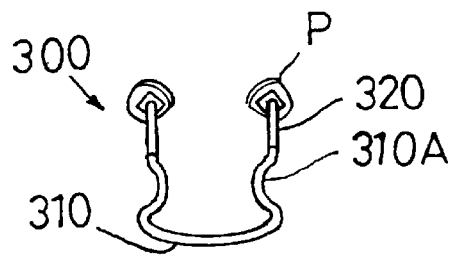
FIG. 9 is a view enlarging a curved hooked member according to the fifth embodiment of the invention.

Fifth Embodiment: Fifth embodiment is described with reference to FIGS. 8 to 11. FIG. 8 is a perspective view showing the eyeglasses as a whole according to the fifth embodiment of the invention, wherein FIG. 8(A) is a view showing a state before a frame body is attached to a front portion, and FIG. 8(B) is a view showing a state after the frame body is attached to the front portion. FIG. 9 is a view enlarging a curved hooked portion according to the fifth embodiment of the invention. Although the curved hooked portion is integrally formed on the frame body 1 at the central position according to the first to fourth embodiments of the invention, the curved hooked portion can be formed of an independent curved hooked device. The curved hooked portion 11 of the frame body 1 according to the first to fourth embodiments of the invention is replaced by a curved hooked member 300 which is independently or separately provided from the frame body 1 as shown in FIG. 8.

According to the fifth embodiment, a groove portion 110 is defined in the frame body 1 although the curved hooked portion 11 is provided on the frame body 1 according to the first to fourth embodiments of the invention. The curved hooked member 300 is provided to be engaged in the groove portion 110 so as to connect between the frame body 1 and a front portion 2, described later. The curved hooked member 300 to be inserted into the groove portion 110 comprises a curved portion 310 and pad arms 320 provided with nose pad members P (see FIG. 9).

The curved portion 310 has throttled portions 310A at both sides, and throttled portions 310A are engaged in the groove portion 110 of the frame body 1 and a groove portion 21 of the front portion 2. The width of the curved portion 310 is ordinarily (when no load is applied) larger than that of the groove portion 21 of the front portion 2, thereby preventing the curved portion 310 engaged in the groove portion 21 from being come off.

Figure 10:
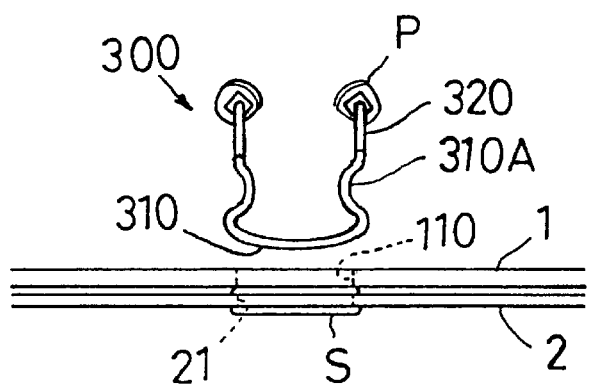
FIGS. 10(A), 10(B) and 10(C) are views showing steps of attaching the frame body to the front portion according to the fifth embodiment of the invention.
Figure 10:
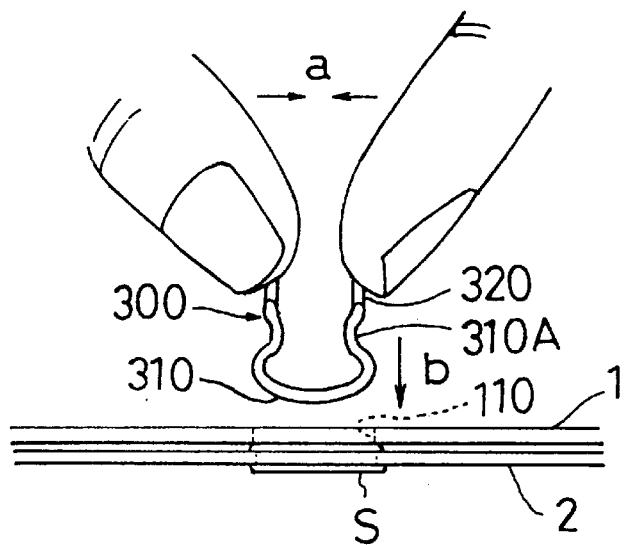
Figure 10:
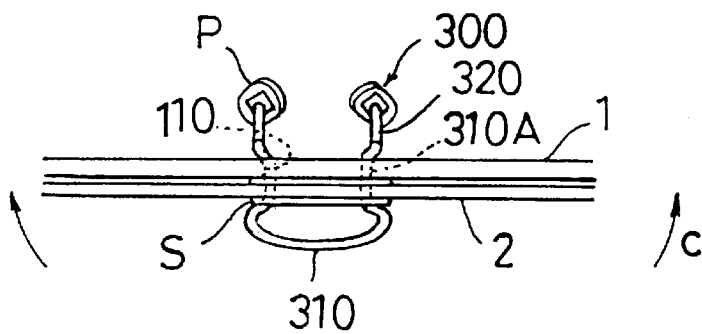

The pad arms 320 are integrally formed with the curved portion 310 by extending both ends of the curved portion 310, wherein the curved portion 310 is more largely curved to exert an elastic pressing effect by strongly gripping the pad arms 320 by fingers (this is described more detail later with reference to FIG. 10). For a material of the curved hooked member 300, a material having an elastic force such as metallic wire or a synthetic resin and the like is employed.

FIGS. 10(A), 10(B) and 10(C) are views showing steps of attaching the frame body to the front portion according to the fifth embodiment of the invention. In the first step, the groove portion 21 defined in the central portion of the front portion 2 and the groove portion 110 defined in the central portion of the frame body 1 is aligned with each other so that they become at the same position. At the same time, the pad arms 320 are changed in their form from the initial state shown in FIG. 10(A) to a state as shown in FIG. 10(B) where the pad arms 320 are strongly gripped by fingers in the direction of the arrow a so that the curved portion 310 is largely bent.

In the second step, the curved hooked member 300 is pressed against the groove portion 110 of the frame body 1 and the groove portion 21 of the front portion 2. In this case, as shown in FIG. 10(B), the curved portion 310 of the curved hooked member is strongly thrust into the groove portion 21 of the front portion 2 in the forward direction (in the direction of the arrow b) while contacting the groove portion 110 of the frame body 1. When the groove portion 110 is thrust into the groove portion 21, the curved portion 310 is inserted into the groove portion 110 of the frame body 1 and the groove portion 21 of the front portion 2 (i.e., the elastic sleeve S).

In the third step, after the curved portion 310 is inserted into the groove portion 110 of the frame body 1 and the groove portion 21 of the front portion 2, the fingers are released from the curved portion 310 so that the curved portion 310 is expanded to its original state by a restoring force. As a result, the throttled portions 310A are retained by the groove portion 110 of the frame body 1 and the groove portion 21 of the front portion 2 (by the elastic sleeve S, more in detail). Accordingly, the curved hooked member 300 is supported by and fixed to (elastically engaged in) the groove portion 110 of the frame body 1 and the groove portion 21 of the front portion 2 (See FIG. 10(C)).

In such a manner, when an operation procedure comprising three steps of grip→insertion→release is effected all at once at the curved hooked member 300 between the frame body 1 and front portion 2 so that the frame body 1 can be attached to the front portion 2 by one-touch simple operation, which is very convenient in handling. Meanwhile, it is easily understand that when the frame body 1 is detached from the front portion 2, an operation procedure comprising three steps of grip→removal→release is effected all at once so that the frame body 1 can be detached from the front portion 2 by one-touch simple operation.

As mentioned in the foregoing, upon completion of the attachment of the frame body 1 to the front portion 2, the curvature of the front curve of the front portion 2 becomes smaller than that before the frame body 1 is attached to the front portion 2 so that a repulsive force is produced at both ends of the front portion 2 so as to strongly press the frame body 1 (in the direction of the arrow c). A pressing force of the frame body 1 is uniformly applied to both ends of the front portion 2 to the right and left. The frame body 1 is supported by and fixed to the front portion 2 in a state where the curved hooked member 300 is supported and engaged by (elastically engaged by) the groove portion 21 of the front portion 2 at the center so that the frame body 1 is brought into contact with both ends of the front portion 2 under pressure.

That is, the frame body 1 is supported by the front portion 2 at three points, i.e., the center and both ends of the front portion 2 by the curved hooked member 300, so that a play is not produced between frame body 1 and front portion 2, thereby rendering both the frame body 1 and front portion 2 always stable. For all the benefits set forth above, both ends of the front portion 2 and the frame body 1 are kept in a free state, and hence the degree of freedom of motion of the lens per se is assured.

According to the attachment structure of a frame body relative to a front portion of the fifth embodiment of the invention, when the eyeglasses are put on or put off from the face, or a shock is applied to the eyeglasses, an unexpected undue force is applied to the frame body 1, so that the frame body 1 is deformed (curved). However, such deformation is not directly transmitted to the front portion 2, imposing no strain or load to the lens of the front portion 2.

Figure 11:
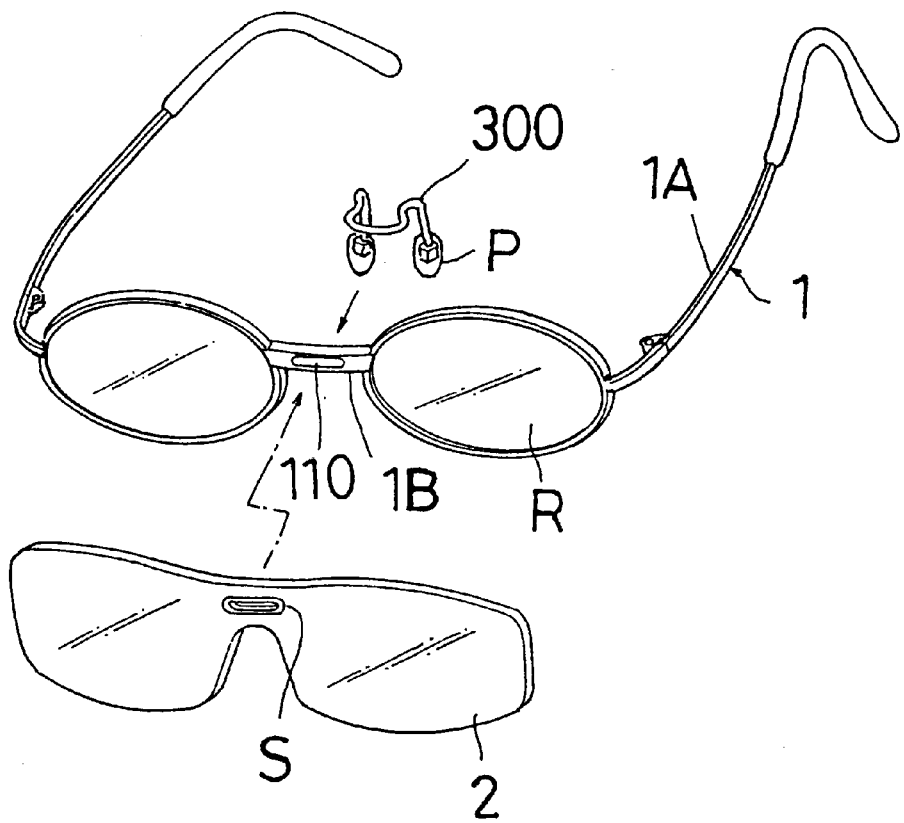
Figure 11:
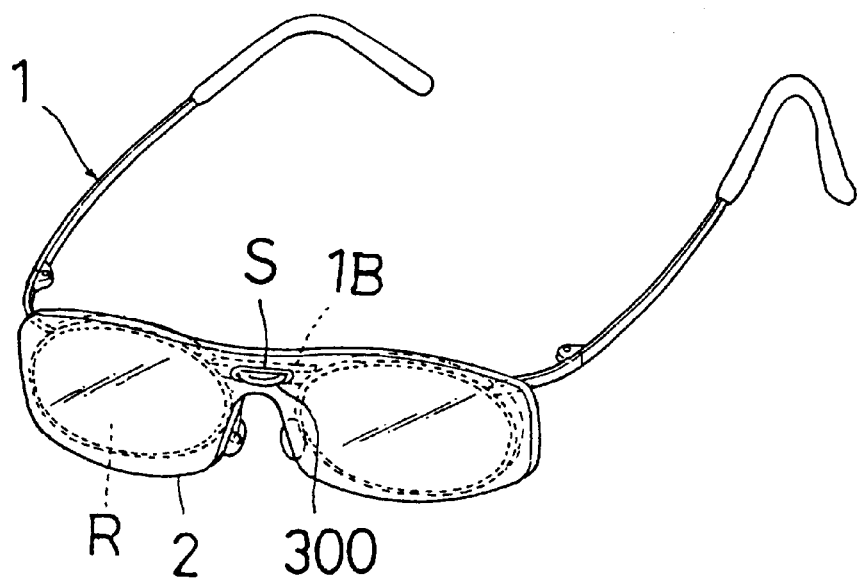

Although the invention has been described above in detail, it is needles to say that the invention is not limited to these embodiments, but can be variously modified without departing from the spirit of the invention. For example, although the pad arms are attached to the curved hooked portion, they are not limited to such a curved hooked portion. Further, the lens may be attached to the FIG. 11 is a perspective view showing the eyeglasses as a whole according to a modification of the fifth embodiment, which are provided with lenses R attached to the frame body 1 of the fifth embodiment of the invention. The groove portion 110 is formed in the bridge 1B. Further, the frames or frame shown in FIGS. 6 and 7 is provided for completely holding the periphery of lenses and fixing the lenses thereto, it is needless to say that the frame may be formed of any form if it can hold substantially half upper half of the lenses. Still further, the method of attaching the frame body to the front portion according to the third embodiment may be applied to the first embodiment, and the method of method of attaching the frame body to the front portion according to other embodiments may be applied to either the first or third embodiment of the invention.

As mentioned above, the frame body 1 can be attached to or detached from the front portion with one-touch operation, and hence both the frame body 1 and front portion can be easily operated. Further, although the attachment structure of a frame body relative to a front portion has a simple structure such that the frame body 1 and front portion are elastically engaged with each other at the central positions, the frame body can be reliably attached to the front portion in a stale state without producing a play therebetween. Still further, even if the frame body 1 is distorted and deformed, the distortion is hardly transmitted to the front portion. More still further, since the attachment structure is simplified, the eyeglasses have a large visual field and light weight, and can be reduced in a manufacturing cost.

What is claimed is:

1. An attachment structure of a frame body relative to a front portion comprising a curved hooked portion formed on the frame body at the central position, and a groove portion defined in the front portion at the central position, wherein the curved hooked portion elastically presses the groove portion so as to engage the curved hooked portion in the groove portion.

2. An attachment structure of a frame body relative to a front portion comprising a curved hooked portion formed to stand upright on the frame body at the central position and provided with a pair of pad arms fixed thereto, and a groove portion defined in the front portion, at the central position, wherein the curved hooked portion elastically presses the groove portion so as to engage the curved hooked portion in the groove portion.

3. The attachment structure of a frame body relative to a front portion according to claim 2, wherein the curved hooked portion is attached to the groove portion by way of an elastic sleeve.

4. The attachment structure of a frame body relative to a front portion according to claim 2, wherein the groove portion is a notched portion which is opened outward.

5. The attachment structure of a frame body relative to a front portion according to claim 2, wherein the front portion is a frameless lens.

6. The attachment structure of a frame body relative to a front portion according to claim 2, wherein the front portion is lenses having a frame fixed thereto.

7. The attachment structure of a frame body relative to a front portion according to claim 2, wherein a lens is attached to the frame body.

8. The attachment structure of a frame body relative to a front portion according to claim 2, wherein the curved hooked portion is formed on the frame body to stand upright inwardly.

9. The attachment structure of a frame body relative to a front portion according to claim 2, wherein the curved hooked portion is formed on the frame body to stand upright outwardly.

10. An attachment structure of a frame body relative to a front portion comprising a curved hooked portion formed on the frame body at the central position to stand upright outwardly and provided with a pair of pad arms fixed thereto, and a groove portion defined in the front portion at the central position, wherein the front portion is formed of a frameless lens, and the curved hooked portion elastically presses the groove portion so as to engage the curved hooked portion in the groove portion by way of an elastic sleeve.

11. An attachment structure of a frame body relative to a front portion comprising a first groove defined in the frame body at the central position and a second groove defined in the front portion at the central position, a curved hooked member provided with a pair of pad arms respectively elastically presses both the first and second grooves so as to engage the curved hooked member in both the first and second grooves.

12. The attachment structure of a frame body relative to a front portion according to claim 11, wherein the curved hooked member is attached to the groove portion by way of an elastic sleeve.

13. The attachment structure of a frame body relative to a front portion according to claim 11, wherein the front portion is a frameless lens.

14. The attachment structure of a frame body relative to a front portion according to claim 11, wherein the front portion is lenses having a frame fixed thereto.

15. The attachment structure of a frame body relative to a front portion according to claim 11, wherein the curved hooked member is provided with a pair of pad arms extended from the curved portion.

* * * * *